United States Patent

Cao et al.

[11] Patent Number: 5,858,063
[45] Date of Patent: Jan. 12, 1999

[54] OXYGEN CONCENTRATOR WITH BEDS' DUTY CYCLE CONTROL AND SELF-TEST

[75] Inventors: Tuan Quoc Cao, Davenport; Russell Frank Hart, Blue Grass; William David Molis, Davenport; Richard Kent Frantz, Davenport; Charles Bradley Hager, Davenport; Victor Paul Crome, Davenport, all of Iowa

[73] Assignee: Litton Systems, Inc., Davenport, Iowa

[21] Appl. No.: 868,419

[22] Filed: Jun. 3, 1997

[51] Int. Cl.⁶ .................................................. B01D 53/047
[52] U.S. Cl. ..................................... 95/11; 95/98; 95/105; 95/130; 96/111; 96/117; 96/130; 96/144
[58] Field of Search ............................... 95/8, 11, 96–98, 95/102, 105, 130; 96/111, 115, 117, 130, 144

[56] References Cited

U.S. PATENT DOCUMENTS

| | | | |
|---|---|---|---|
| 3,703,068 | 11/1972 | Wagner | 95/11 |
| 3,922,149 | 11/1975 | Ruder et al. | 95/96 X |
| 4,349,357 | 9/1982 | Russell | 95/130 X |
| 4,449,990 | 5/1984 | Tedford, Jr. | 95/102 X |
| 4,472,177 | 9/1984 | Sircar | 95/11 |
| 4,516,424 | 5/1985 | Rowland | 95/11 X |
| 4,543,109 | 9/1985 | Hamlin et al. | 95/98 |
| 4,561,287 | 12/1985 | Rowland | 95/11 |
| 4,631,073 | 12/1986 | Null et al. | 95/8 X |
| 4,648,888 | 3/1987 | Rowland | 95/8 |
| 4,661,124 | 4/1987 | Hamlin et al. | 55/21 |
| 4,693,730 | 9/1987 | Miller et al. | 95/8 |
| 4,927,434 | 5/1990 | Cordes et al. | 95/98 X |
| 5,004,485 | 4/1991 | Hamlin et al. | 55/160 |
| 5,071,453 | 12/1991 | Hradek et al. | 55/21 |
| 5,154,737 | 10/1992 | Jenkins et al. | 95/11 |
| 5,258,056 | 11/1993 | Shirley et al. | 95/97 X |
| 5,340,381 | 8/1994 | Vorih | 95/105 X |
| 5,407,465 | 4/1995 | Schaub et al. | 95/105 X |
| 5,474,595 | 12/1995 | McCombs | 95/96 X |
| 5,486,226 | 1/1996 | Ross et al. | 95/11 |
| 5,529,607 | 6/1996 | Tan | 95/105 X |
| 5,531,807 | 7/1996 | McCombs | 95/96 X |
| 5,656,065 | 8/1997 | Kalbassi et al. | 95/96 |
| 5,711,787 | 1/1998 | Neill et al. | 95/96 |

*Primary Examiner*—Robert Spitzer
*Attorney, Agent, or Firm*—Michael H. Wallach

[57] ABSTRACT

A method of controlling an oxygen concentrator having a first sieve bed operated over successive control periods according to a duty cycle for alternately pressurizing and flushing the first sieve bed and a second sieve bed operated over the successive control periods according to a reciprocal of the duty cycle is disclosed. The duty cycle and the reciprocal duty cycle are adjusted during every second one of the successive control periods to change the pressurizing relative to the flushing of the first sieve bed and to change the flushing relative to the pressurizing of the second sieve bed, for reducing concentration of oxygen produced. The duty cycle and the reciprocal duty cycle are adjusted during remaining control periods to change the flushing relative to the pressurizing of the first sieve bed and to change the pressurizing relative to the flushing of the second sieve bed, such that water vapor is purged from the first and second sieve beds after pressurizing thereof. A pressure-swing adsorption (PSA) subsystem performance check is disclosed. This test is performed as part of a maintenance BIT (Built-In-Test) function. After verifying that the oxygen sensor accuracy is acceptable using prior art techniques, a set of bleed valves are opened to load the oxygen concentrator at a specific flow. The oxygen concentration is then checked via the sensor to determine whether the PSA subsystem is operating to within a predetermined concentration level.

17 Claims, 10 Drawing Sheets

OXYGEN CONCENTRATOR WITH BEDS' DUTY CYCLE CONTROL AND SELF-TEST

FIELD OF THE INVENTION

The present invention relates in general to oxygen generators for aircraft breathing apparatus, and more particularly to an oxygen concentrator with variable alternating bed duty cycle control to regulate oxygen concentration to within altitude-dependent limits, and a self-test feature to reduce support equipment requirements.

BACKGROUND OF THE INVENTION

Oxygen generation for aircraft breathing applications requires that the product gas concentration stays within predetermined altitude-dependent minimum and maximum physiological limits. Normally, the minimum oxygen content of the breathable gas is that required to provide, at all cabin altitudes, the same or greater oxygen partial pressure as at sea level. A maximum oxygen concentration is set to reduce the likelihood of partial lung collapse during low-altitude high G maneuvers. More particularly, the risk of partial lung collapse increases with the risk of total adsorption of entrapped pockets of gas in the lungs, which result from distortion of the lungs during high G maneuvers. The risk of total adsorption of the entrapped gas increases with increased oxygen concentration (i.e. reduced nitrogen concentration).

Methods are known for the generation of low-pressure oxygen-enriched air. One such method is referred to as pressure swing adsorption (PSA) and has the advantage of being able to provide oxygen-enriched air in a short period of time after the supply of a suitable feed gas (e.g. pressurized air). The pressure swing adsorption process uses pressure to control adsorption and desorption. According to this process, the nitrogen in pressurized air is adsorbed in a molecular sieve bed while the oxygen passes through the bed. When the molecular sieve in the bed has become nearly saturated, the bed is vented to atmospheric pressure. This causes most of the nitrogen-adsorbed gases to be desorbed and discharged from the bed. In a two-bed system, when one bed is producing oxygen, some of the enriched product gas is flushed back through the (vented) other molecular sieve bed to further lower the partial pressure of the adsorbed gases in the vented bed and to complete the desorption process. Using two beds which are pressurized and flushed alternately provides a continuous flow of product gas and ensures sufficient pressure for the flushing operation.

Aircraft on-board oxygen generation systems (OBOGS) are known in the art. These systems are based on the molecular sieve gas separation process discussed above. Such systems are said to be "self-regulating" since the pressure swing increases with altitude, and therefore the efficiency of the process also increases to ensure sufficient oxygen concentration at high altitudes. More particularly, since each sieve bed is vented to the atmosphere (or cabin) during its regeneration phase, the bed pressure during desorption decreases with increasing altitude, thereby enhancing the desorption process.

In order to keep the oxygen concentration within maximum limits at low altitudes, processes have been developed to reduce the performance of prior art OBOGS. U.S. Pat. Nos. 4,661,124 and 5,004,485 (Humphrey, et al), disclose an alternating bed oxygen generating system with controlled sequential operation of charge and vent valves according to a series of selectable overall cycle times ranging between a minimum and a maximum, in a number of discrete steps. By extending the overall cycle time, efficiency of the system is reduced thereby regulating the product gas oxygen gas to within physiological maximum limits.

In U.S. Pat. No. 4,661,124, the overall cycle time of the molecular sieve beds is controlled using a pressure transducer on the basis of cabin pressure which is indicative of the altitude at which the aircraft is operating.

In U.S. Pat. No. 5,004,485, an oxygen sensor is used to test the gas concentration and a comparator function is implemented to compare the sensed oxygen concentration with values in a look-up table of desired product gas oxygen concentrations at various altitudes. In response to implementing the comparator function the overall cycle time is controlled to provide suitable concentration levels.

Prior art systems employing overall cycle time control, such as disclosed in U.S. Pat. No. 4,661,124 and 5,009,485 (Humphrey et al) suffer from a disadvantage in that it is difficult to accurately control the output oxygen concentration because performance changes occur over a small range (e.g. 4.5 seconds to 5.5 seconds in some systems, whereas cycles ranging from 5.5 seconds to 8.5 seconds do not result in any performance changes).

Dynamic control of system performance to regulate product gas to within the minimum and maximum physiological limits, requires reliable performance of the oxygen sensor connected to the concentrator output. The use of Built-In-Test (BIT) switches is known in the art for initiating integrity tests for current-limiting oxygen sensors. U.S. Pat. No. 5,071,453 (Hradek, et al) discloses a Built-In-Test function for implementing a system self-test for preflight and an oxygen sensor calibration check for operational level maintenance. When the BIT switch is momentarily depressed, a solenoid valve is energized to direct a flow of air through the oxygen sensor. Once the air reaches the sensor, the sensor output begins to drop indicating reduced oxygen concentration. Upon dropping to below a predetermined warning level, an alarm is activated indicating that the self-test has been successful. If the sensor output does not fall below the predetermined warning level within a defined time period such as 20 seconds, the self-test is deemed to have failed and the warning remains activated. The oxygen sensor calibration check involves energizing the same solenoid valve for passing a flow of air through the sensor in response to a lengthened depression of the BIT switch. During the calibration check, the air flow through the sensor is maintained for a longer period (3 minutes) than during the self-test, so that the sensor output falls below the warning level to within a predetermined threshold calibration range, causing activation of the warning signal. If the output of the oxygen sensor does not fall to within the predetermined calibration range within three minutes, the calibration test is deemed to have failed and the warning remains activated after completion of the test.

Although systems such as discussed above are known for testing the operation of oxygen sensors in OBOGS, the lack of maintenance testing systems for oxygen concentrators results in high support equipment requirements including the use of inlet air sources and test sets (to set the concentrator product flow and measure oxygen composition). Inlet air sources can often become contaminated with moisture and oil, and test sets require calibration control.

SUMMARY OF THE INVENTION

According to the present invention, an on-board oxygen generation system (OBOGS) is provided employing variable bed duty cycle control for regulating the oxygen concentrator output from as low as 30% oxygen concentration to higher than 90% concentration. The variable bed duty cycle control is flexible and accurately controllable. The variable bed duty cycle control of the present invention provides more stable operation than prior art OBOGS with overall cycle length control, such as disclosed in U.S. Pat. Nos. 4,661,124 and 5,004,485 (Humphries, et al.).

During normal operation, the two-bed oxygen generating system of the present invention operates at a 50%—50% duty cycle (e.g. 3 seconds per bed for a 6 second cycle). To control performance of the system, the duty cycles of the two beds are adjusted so that one bed duty cycle is increased while the other bed duty cycle is decreased. The duty cycles can be changed from 50% down to 20% (and from 50% up to 80% on the other bed), at less than 1% steps for enhanced accuracy.

In order to protect the beds from damage due to water vapor contamination, the beds' duty cycles are controlled in an alternating pattern. That is to say, one bed dwells at a longer duty cycle for one control period (e.g. 10 cycles) than the other bed, and vice versa on the next control cycle. By alternating the beds' duty cycles, the two beds are able to purge water vapor after their respective dwelling period.

A further aspect of the present invention is the provision of a pressure-swing adsorption (PSA) subsystem performance check. This test is performed as part of a maintenance BIT (Built-In-Test) function. After verifying that the oxygen sensor accuracy is acceptable using prior art techniques, a set of bleed valves are opened to load the oxygen concentrator at a specific flow. The oxygen concentration is then checked via the sensor to determine whether the PSA subsystem is operating to within specification (i.e. concentration limit above a predetermined level—such as 50%).

BRIEF DESCRIPTION OF THE DRAWINGS

A detailed description of the preferred embodiment is provided herein below, with reference to the following drawings in which.

DETAILED DESCRIPTION OF THE PREFERRED EMBODIMENT

Figure 1:
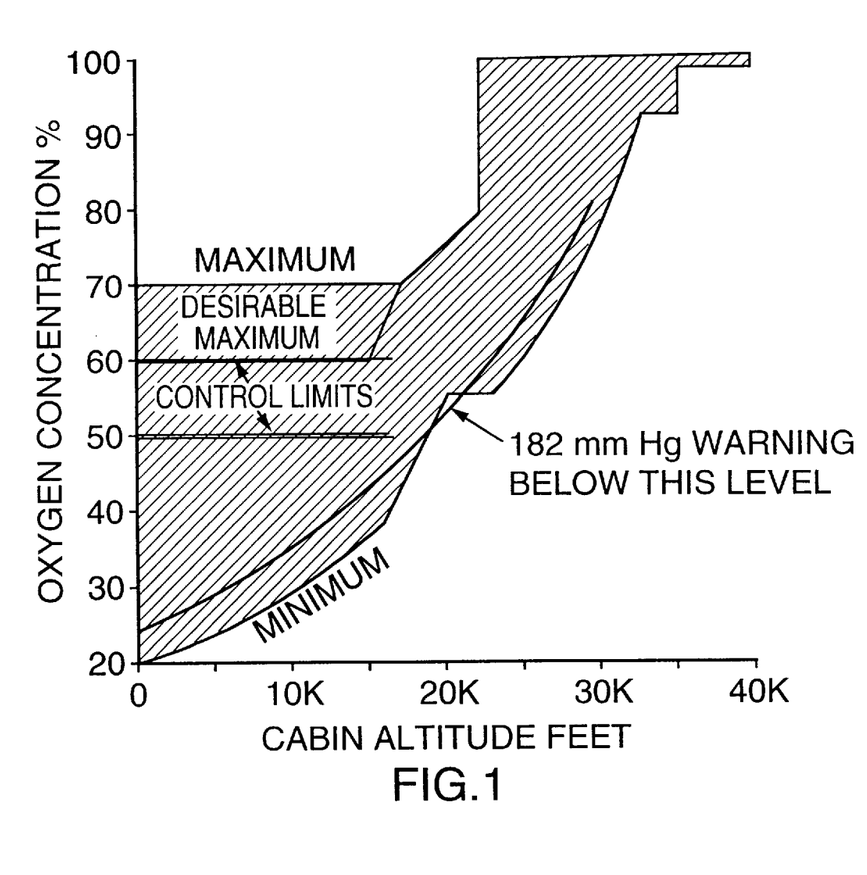
FIG. 1 shows oxygen concentration curves which govern the operation of the oxygen generator according to the preferred embodiment.

FIG. 1 is a graphical representation of the relationship between cabin altitude and oxygen concentration of breathable gas supplied to the crew of a high performance military aircraft. As discussed above, the oxygen concentration of breathable gas supplied to the aircrew must be within predetermined maximum and minimum limits. The shaded region within FIG. 1 represents the permissible levels of oxygen concentration at various cabin altitudes.

The maximum oxygen concentration is 70% at altitudes up to approximately eighteen thousand feet, although a desirable maximum concentration is 60% up to a cabin altitude of fifteen thousand feet rising linearly with cabin altitude to a value of 70% at eighteen thousand feet. From eighteen thousand feet, the maximum permissible oxygen concentration rises linearly to a value of 80% at twenty thousand feet. At cabin altitudes above this level, there is no maximum limit for oxygen content in the breathable gas.

The curve in FIG. 1 passing through the shaded region (except for a portion in the vicinity of twenty thousand feet identified as "182 mmHg-warning below this level"), represents the constant oxygen partial pressure at a value corresponding to that of the minimum required in the breathable gas at a cabin altitude of twenty thousand feet. At sea level, this curve shows that the gas composition that it represents to have oxygen concentration of 24% as compared with the approximately 20% oxygen content of air at sea level.

The minimum oxygen content for aircrew breathable gas begins in the lower section as a curve covering cabin altitude ranging from sea level up to approximately sixteen thousand feet where the curve is parallel to the curve representing constant oxygen partial pressure at sea level. Between cabin altitudes of sixteen thousand feet and twenty thousand feet, the minimum curve rises linearly and more steeply than the plot of constant oxygen partial pressure to accommodate the effects of accidental rapid cabin depressurization. Between twenty thousand feet and twenty-three thousand feet, the minimum required oxygen content remains constant at approximately 55%, after which the minimum required content rises with cabin altitude as a continuation of the sea level equivalent partial pressure curve until an altitude of approximately thirty-one thousand feet. At thirty-one thousand feet, the minimum required oxygen content remains constant at approximately 91% until an altitude of approximately thirty-six thousand feet whereupon the minimum permissible oxygen concentration rises to 98% for all higher altitudes.

Figure 2:
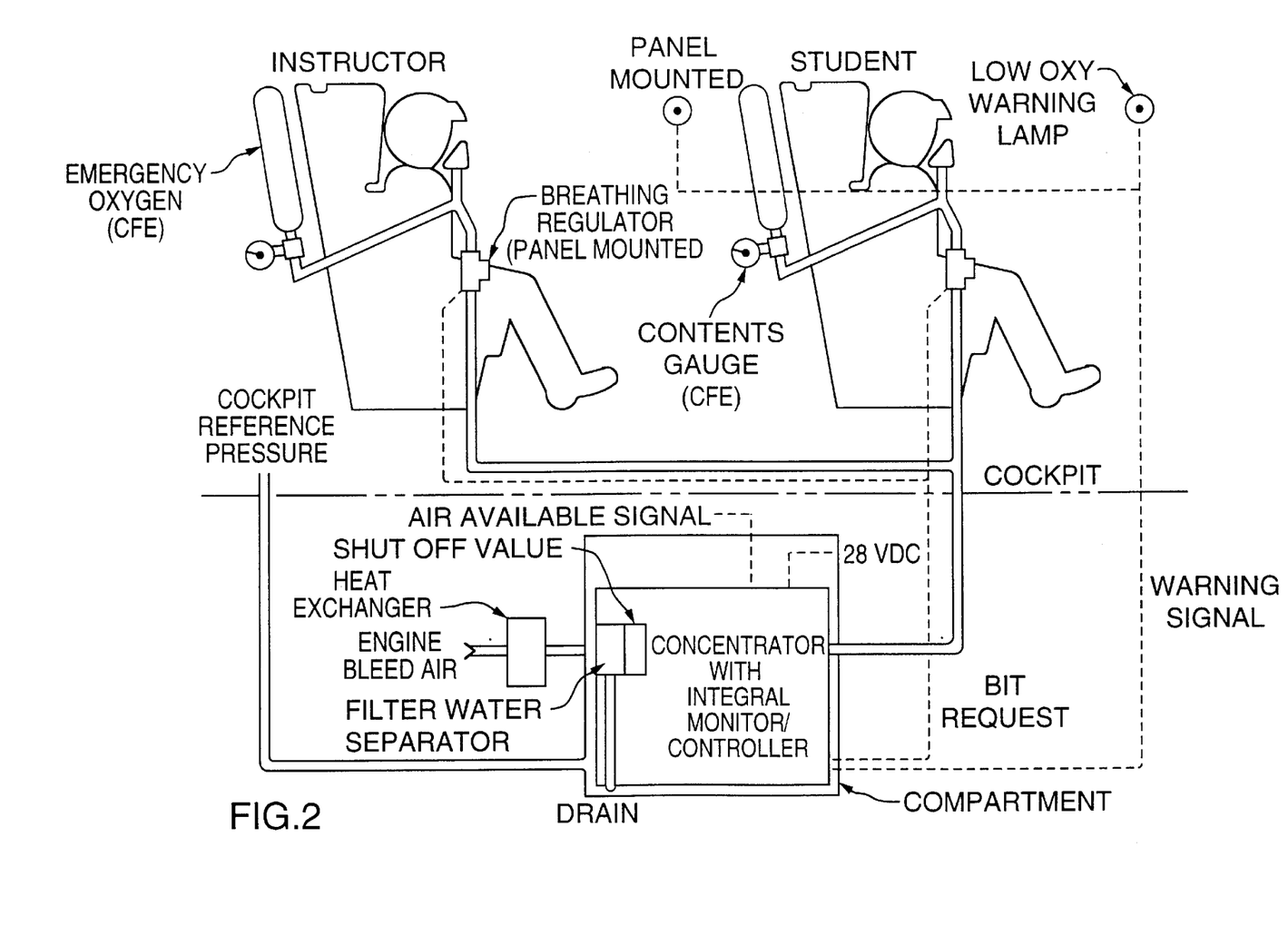
FIG. 2 is a functional schematic of an aircraft on-board oxygen generation system (OBOGS) incorporating a PSA concentrator subsystem and controller/monitor according to the preferred embodiment.

With reference to FIG. 2, a functional schematic diagram is provided of an aircraft on-board oxygen generation system (OBOGS) employing variable bed duty cycle control for regulating oxygen concentration, and a performance check function as discussed in greater detail below. The OBOGS illustrated in FIG. 2 utilizes conditioned engine bleed air and electrical power from the aircraft resources to provide oxygen enriched air for crew member breathing within the range identified as "CONTROL LIMITS" in FIG. 1. The present invention is embodied within the block labeled "oxygen concentrator with integral monitor/controller." A detailed wiring diagram of the interface between the aircraft and OBOGS of FIG. 2 is shown in FIG. 4, and is discussed in greater detail below with reference to the performance test features of the present invention.

Figure 3A:
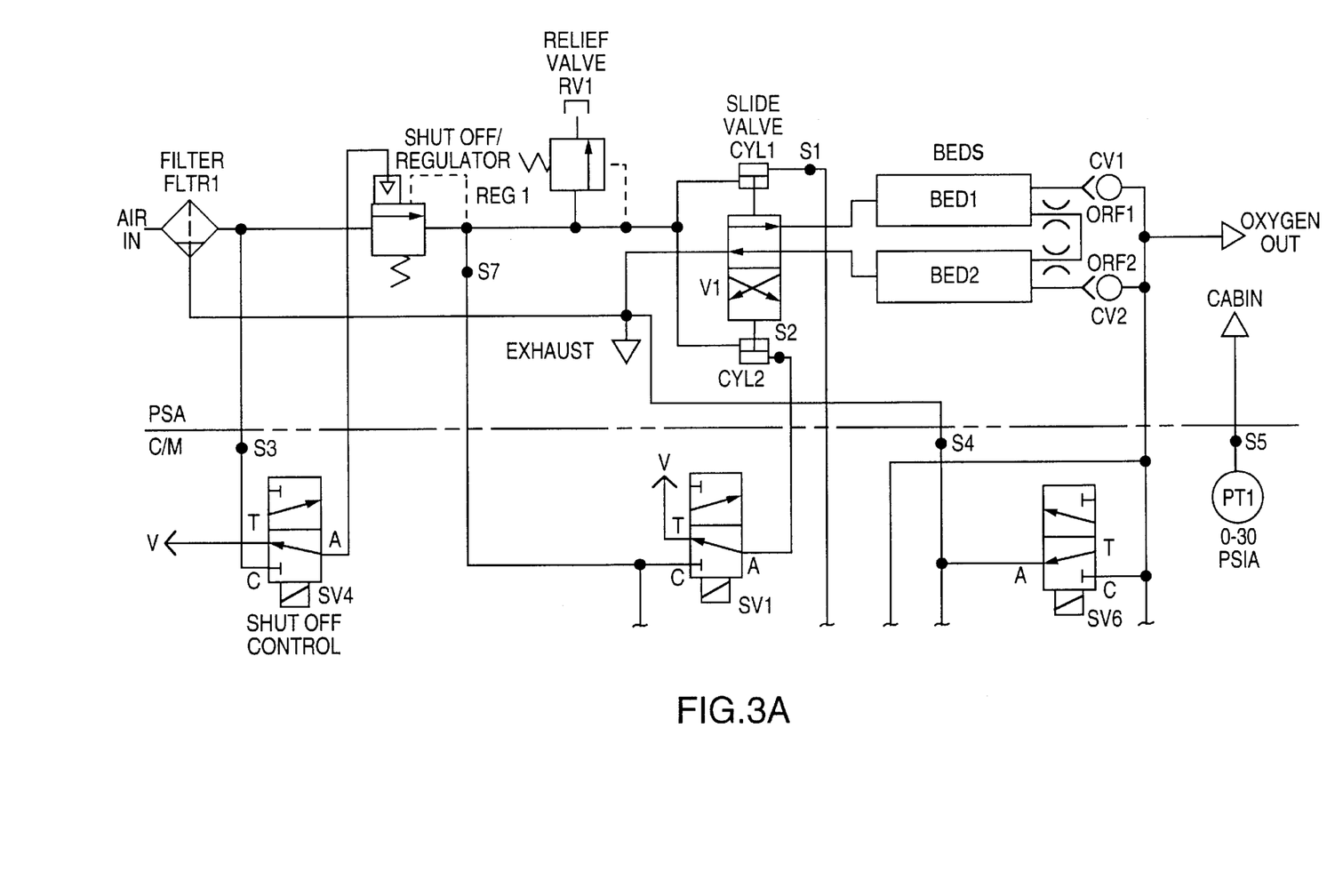
FIG. 3 is a pneumatic schematic of the PSA concentrator subsystem and controller/monitor according to the preferred embodiment.
Figure 3B:
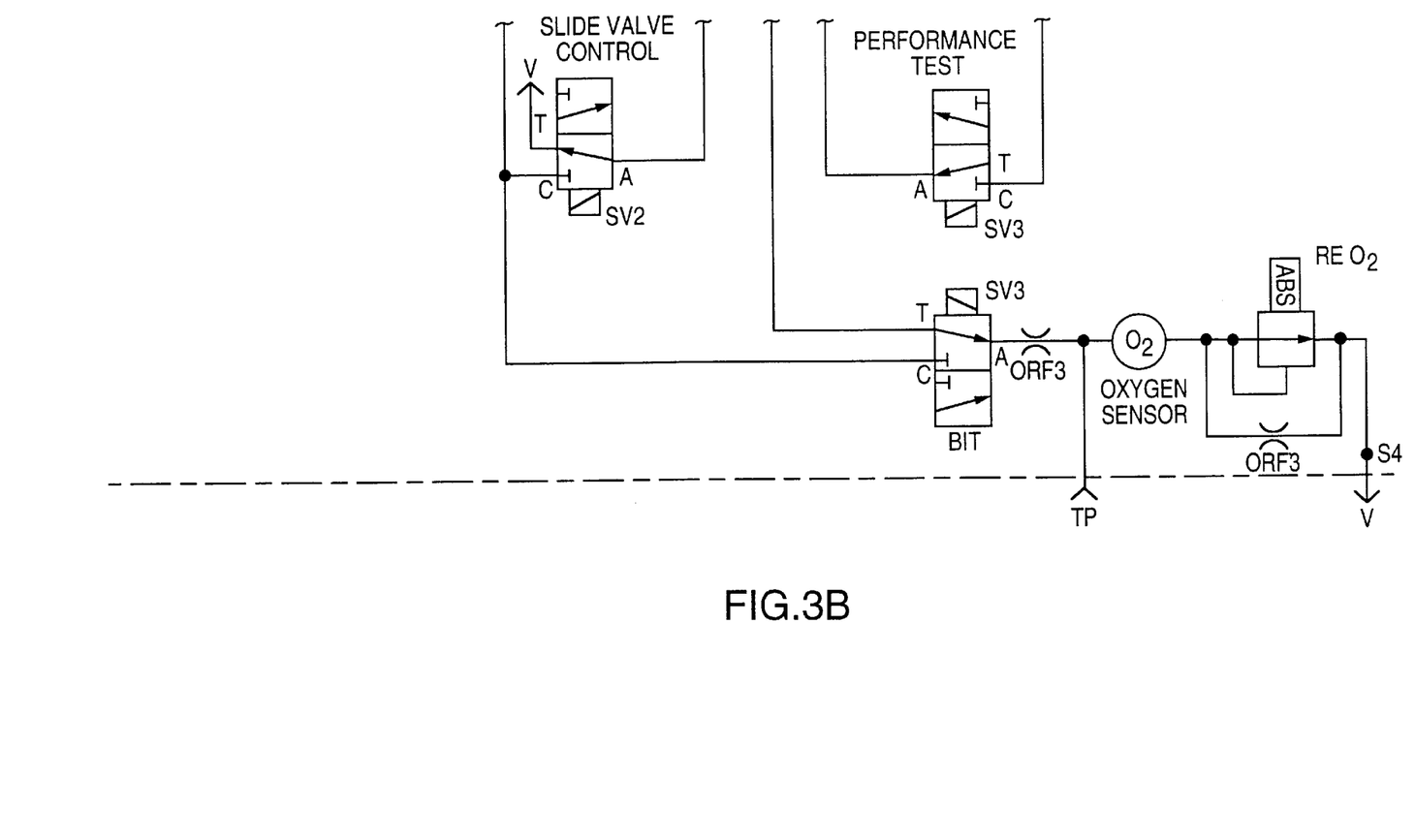

Turning to the concentrator pneumatic schematic of FIG. 3, the concentrator with integral monitor/controller is shown divided into two functional portions. The pressure swing absorption (PSA) portion implements the oxygen concentration function while the controller/monitor (C/M) portion implements control of the PSA components, monitoring of oxygen levels provided to the aircrew and implementing test sequences for all components.

In operation, bleed air enters the concentrator and passes through a filter/water separator FLTR1, through pilot-operated shut-off valve/regulator REG1, which regulates pressure to conserve the air supply at low altitudes when concentrator inlet pressures are greater than required. The conditioned air then flows to pilot pressure-driven slide valve V1 which sequentially ports the air to the molecular sieve beds BED1 and BED2.

The two oxygen beds, BED1 and BED2, operate as an alternating pair so that when one bed is pressurized, adsorbing nitrogen, and producing oxygen-enriched product gas, the other bed is venting to ambient air and desorbing nitrogen from the prior pressurization. The regeneration by desorption of nitrogen in the vented bed is enhanced by a reverse flow of oxygen-enriched gas from the output or product end of the pressurized bed. The amount of the reverse or purge flow through the vented bed is controlled by purge orifice restrictors ORF1 and ORF2, located in a flow path connected to the output ends of the two beds.

The two oxygen beds are cycled alternately between the pressurization or oxygen-producing mode and the vented (or flushed), regenerative, nitrogen-purging mode by the slide valve V1. The oxygen-enriched output product gas from the pressurized beds flows through check valves CV1 and CV2 and on to the crew member breathing gas delivery lines (FIG. 2). Oxygen sensor O2 provides a continuous monitoring of the outlet gas quality and provides a warning signal to detect off-limit conditions, as discussed in greater detail below.

Filter/water separator FLTR1 functions as a particulate filter as well as a water separator. The supply of air passes through the filter FLTR1 such that particles and liquid droplets are trapped. Liquid droplets gradually pass through the filter element where they are coalesced at the output surface and removed through a small orifice at the bottom of the filter housing, where a small hose connection attaches a drain line. The drain line is routed to the concentrator EXHAUST for disposal of the removed water. Water elimination is therefore automatic and continuous.

The combination shutoff valve/regulator REG1 is located at the input to the concentrator, just after the filter FLTR1, so that the concentrator may be shut down by a command from the C/M or deactivated when electrical power is removed. The shutoff valve utilizes inlet air pressure supplied through the pilot solenoid valve SV4, which is located within the C/M to control the shutoff valve. The shutoff valve is spring loaded in the closed position and opens only when pilot solenoid valve SV4 is energized, allowing the inlet pressure to overcome the spring pressure. The shutoff valve protects the molecular sieve beds in the event air pressure is available and the C/M does not have electrical power. Screen S3 prevents contaminants from entering solenoid valve SV4.

The pressure regulator is used to maintain molecular sieve bed pressure, and therefore pressure swing, at a constant value so that unit performance is not affected by upstream variations in air pressure, and to avoid excessive air use when the inlet pressure is high.

The regulator produces a controlled gauge pressure, and the output pressure is established by a force balance between output pressure against a piston and a helical spring.

Pressure swing cycling of the molecular sieve beds is accomplished through the use of reciprocating slide valve V1. The valve is activated by two opposing air cylinders, CYL1 and CYL2, which are pressurized/vented by two pilot solenoid valves, SV1 and SV2. When one cylinder is pressurized, the other is vented, and the valve is pushed to one side. This pressurizes one oxygen bed and vents the other. An electronic timing circuit in the C/M causes the solenoid valves to change state so that the slide valve moves to the other side, and the other bed is pressurized while the original bed is vented. The cycle rate is selected to best accommodate flight conditions.

Screens S1 and S2 are integral to the slide valve and prevent any particulate matter from entering solenoid valves SV1 and SV2.

The oxygen beds BED1 and BED2 are preferably constructed of aluminum tubing.

Check valves CV1 and CV2 are built into the output flow tube of the oxygen beds and direct the output of the producing bed to the connector outlet and limit the backflow which purges the molecular sieve of the nonproducing bed.

Purge flow for the oxygen beds is accomplished through dual precision-machined orifices ORF1 and ORF2 contained in a crossflow tube connecting the bed caps upstream of the check valves.

As shown in FIGS. 2 and 6, the concentrator includes a C/M that monitors and controls the concentrator. The C/M provides the operator with continuous verification of acceptable concentrator performance and detection of concentrator failures, as well as verification of the C/M functionality.

In the normal monitoring mode, the oxygen product gas flows through solenoid valve SV3 to oxygen concentrator O2. Orifice ORF3 is an integral port of the manifold assembly and limits the flow through the sensor. The oxygen sensor chamber pressure is controlled by downstream absolute pressure regulator REG2. The small gas sample is then vented out through a vent port in the side of the C/M case. Pressure transducer PT1 continuously monitors the cabin pressure and is used in conjunction with the oxygen concentration measurement in calculating the partial pressure of oxygen ($PPO_2$) being supplied to the aircrew. PT1 is exposed to cabin ambient conditions and screen S5 protects this port from contaminants.

The C/M provides a warning via a discrete warning signal whenever the partial pressure of oxygen drops below a specified limit, as shown in FIG. 6.

The control function of the C/M includes two solenoid valves, SV1 and SV2, that are alternately energized to control the cycling of the slide valve V1.

Solenoid valve SV3 is used for the BIT function (discussed in greater detail below). Under normal operation conditions, SV3 is deenergized and continuously routes concentrator product gas to the oxygen sensor. When SV3 is energized, inlet air is supplied to the oxygen sensor to perform an accuracy check on the sensor and associated electronics.

Solenoid valve SV4 controls the pilot pressure that is supplied to shutoff valve/regulator REG1. When SV4 is energized, inlet pressure is supplied to the shutoff valve and the shutoff valve opens.

Composition control (which is active for altitudes less than 15K ft) is selected by placing the OXYGEN SELECT toggle located on the panel mounted breathing regulator (FIG. 6) in the NORMAL position. This in turn, provides a control signal to the C/M which activates the duty cycle control mechanism. In this mode, the oxygen concentration is controlled within the limits shown in FIG. 1. This control is accomplished by varying the operation of the slide valve V1. The slide valve responds to signals from the C/M, which continuously compares the product gas oxygen concentration to an ideal level and varies the slide valve operation accordingly to maintain the required concentration.

Figure 4A:
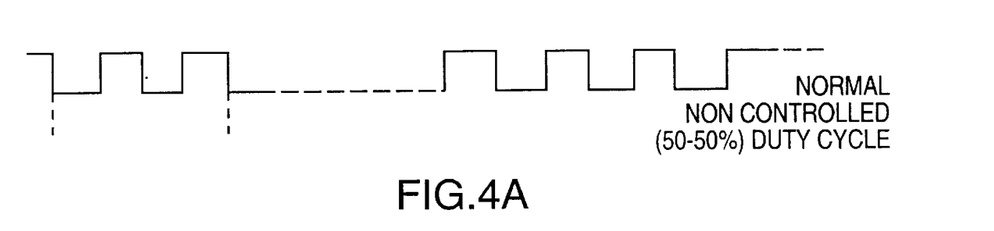
FIG. 4 comprises FIGS. 4a and 4b, and is a timing diagram showing the alternating beds' duty cycle control of the PSA concentrator subsystem according to the preferred embodiment.
Figure 4B:
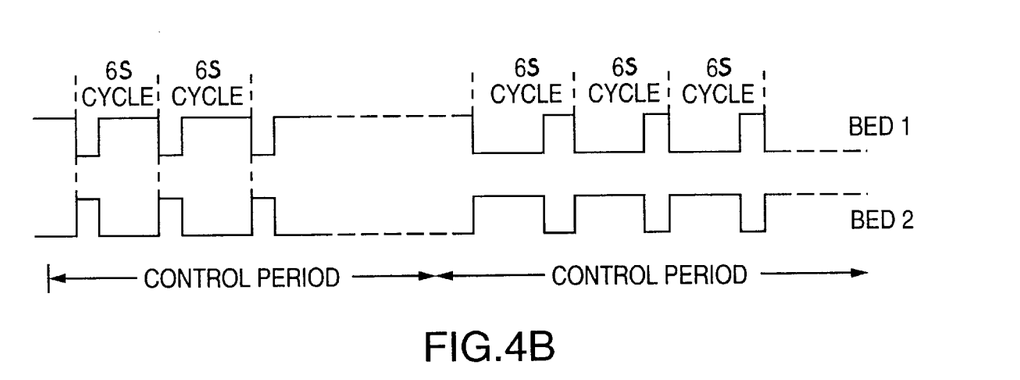

More particularly, as discussed above, in order to keep the product gas concentration within limits at lower altitudes, a process is developed in accordance with the present invention to degrade the performance of the oxygen concentrator system. This process is termed variable bed duty cycle control. In normal operation, the two-bed oxygen generating system operates at 50—50% duty cycle (i.e. 3 seconds per bed), as shown in FIG. 4a. To control performance of the system, the duty cycles of the two beds are changed so that one bed duty cycle is increased while the other bed duty cycle is decreased, as shown in FIG. 4b. The duty cycles can be changed from 50% down to 20% (50% up to 80% on the other bed) at less than 1% steps.

As shown in FIG. 4b, in order to protect the beds from damage by water vapor contamination, the bed duty cycles are controlled in alternate pattern. Specifically, one bed dwells in a longer "purge" mode during one control period (e.g. 10 cycles of 6 seconds each), and then reverses to dwell in a longer "generate" mode during the next control period. By alternating the variable bed duty cycle, the two beds (BED1 and BED2) are able to purge water vapor after their respective dwelling periods and thereby protect the beds from water vapor contamination damage.

Figure 5:
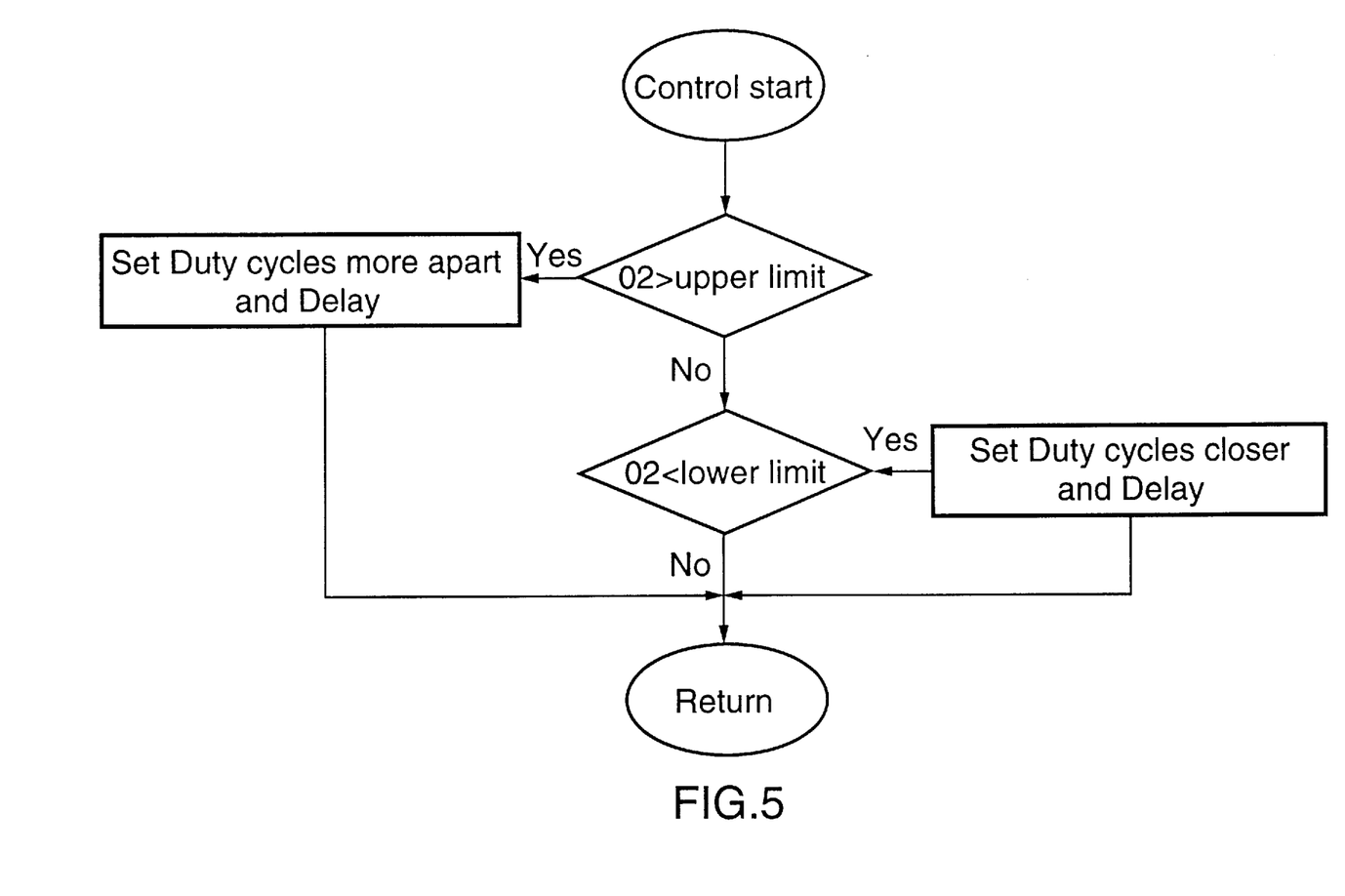
FIG. 5 is a flowchart showing an algorithm implemented by the controller/monitor for the duty cycle control shown in FIG. 4.
Figure 6A:
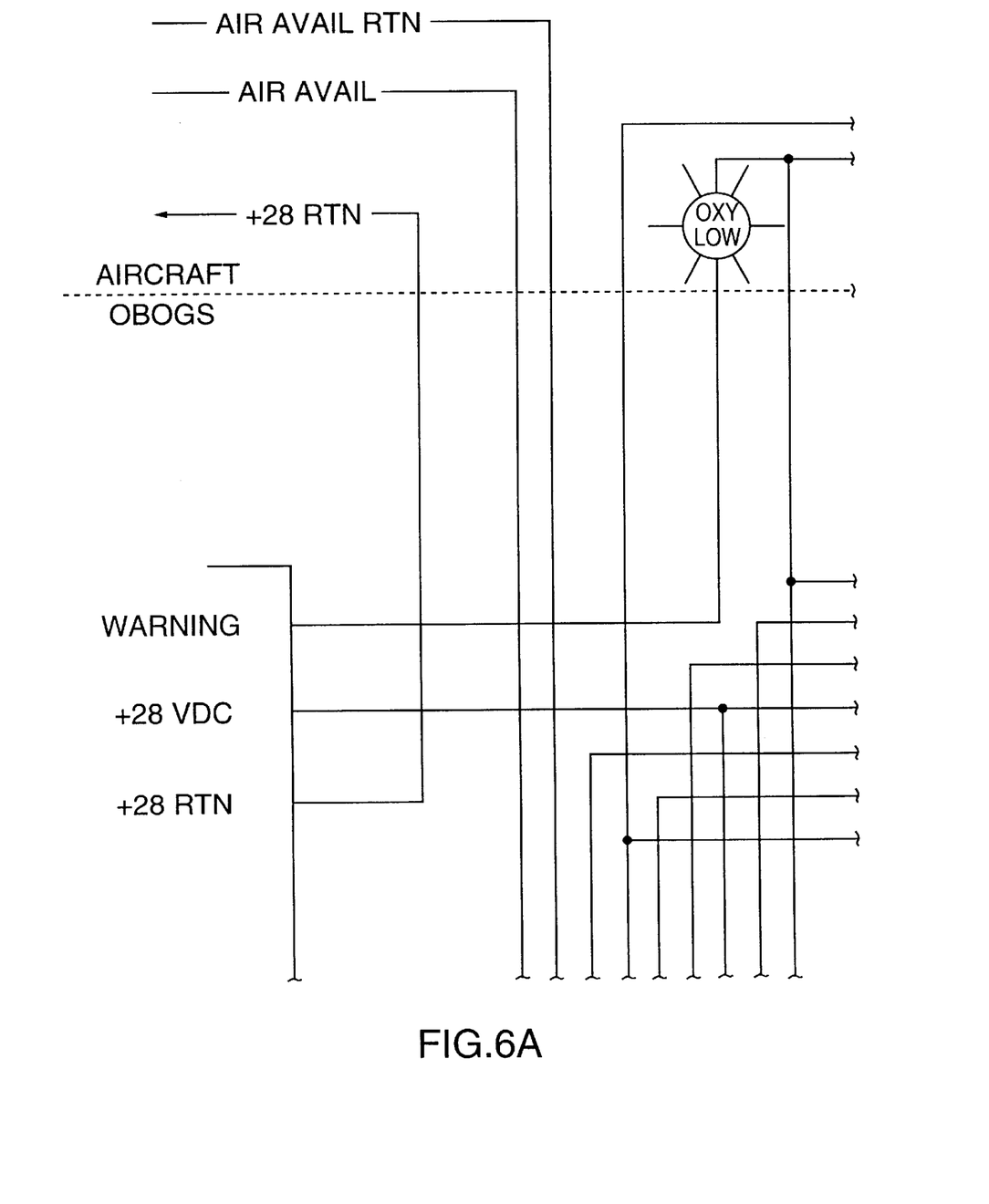
FIG. 6 is a wiring diagram of the OBOGS shown in FIG. 2, according to the preferred embodiment.
Figure 6B:
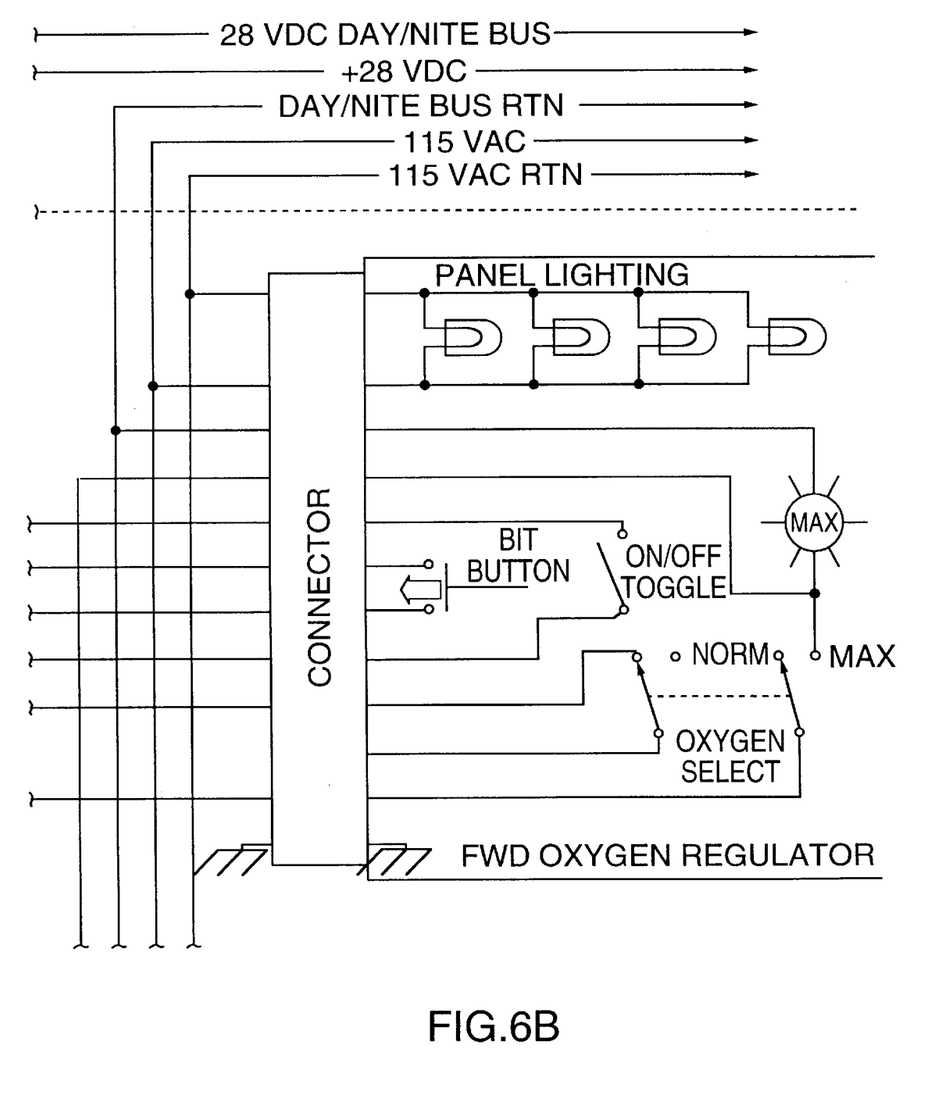
Figure 6C:
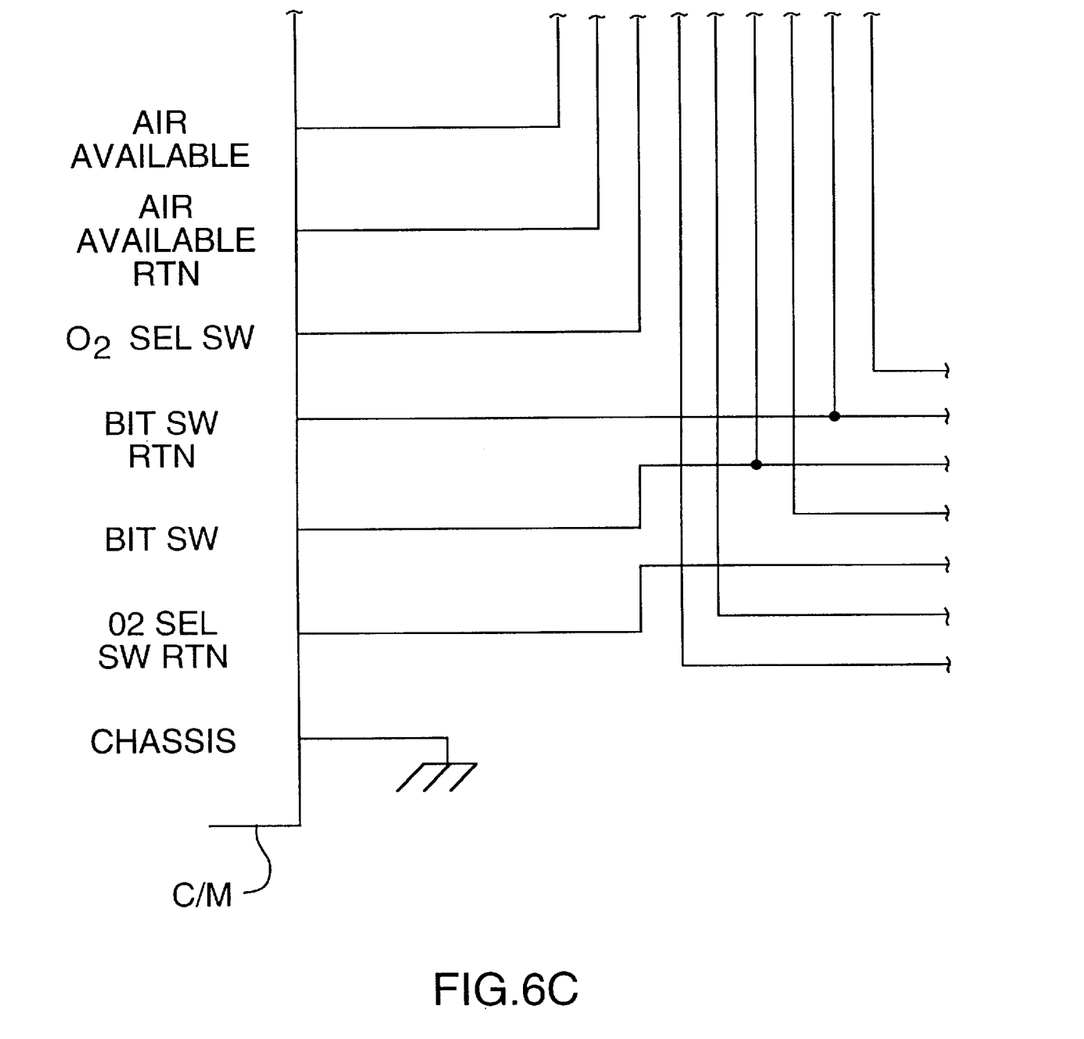
Figure 6D:
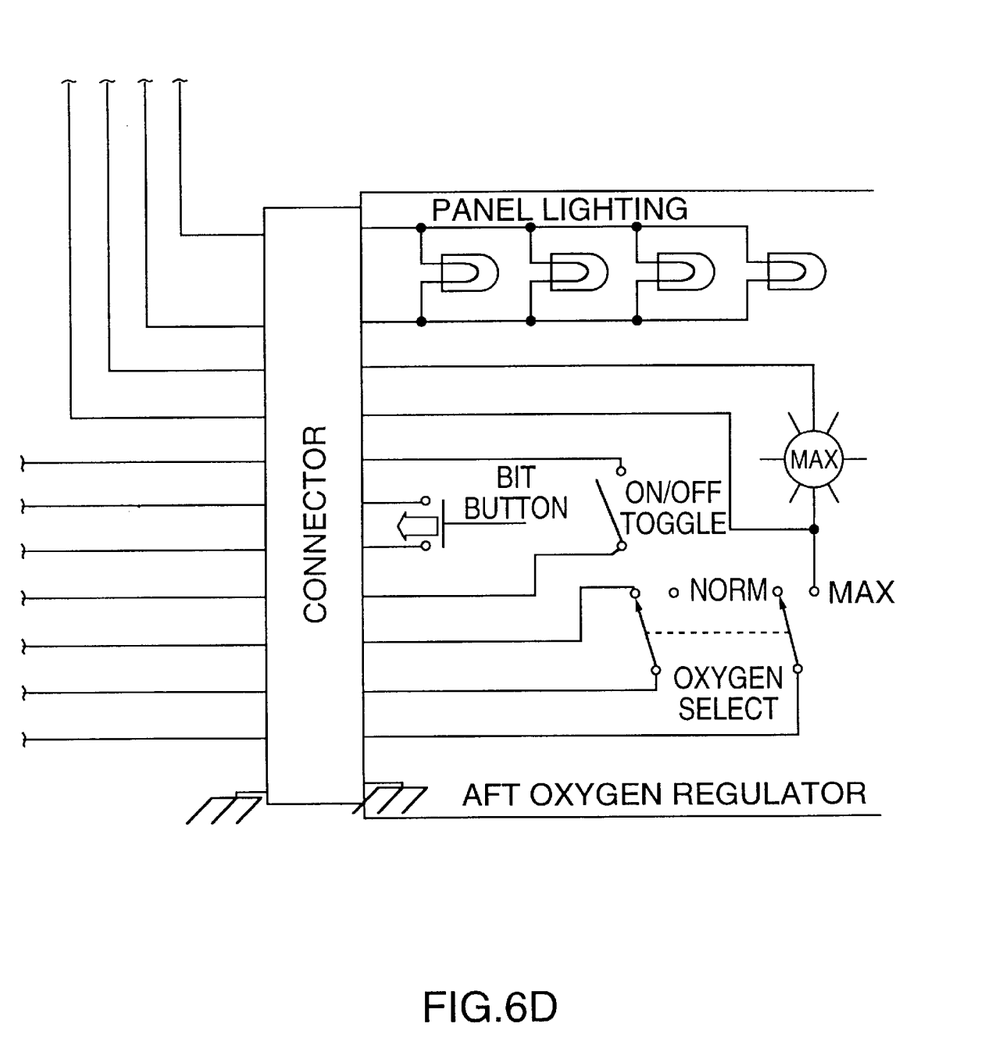

As shown in FIG. 5, the C/M implements an algorithm or process for duty cycle control beginning at "Control Start". First, the oxygen concentration is tested via the 02 sensor. If "02>upper limit" is "Yes", then the C/M functions to "Set Duty cycles closer and Delay", whereas if "02<lower limit" is "No", then the process returns to "Control Start". The process also returns to "Control Start" after either of "Set Duty cycles more apart and Delay" or "Set Duty cycles closer and delay". Thus, the change in duty cycle depends on how much greater the 02 concentration is than the upper limit or how much smaller the 02 concentration is than the lower limit.

As discussed above, according to another aspect of the present invention, self test features are designed into the control/monitor (C/M) in order to reduce support equipment requirements. The various modes of operation of the C/M are discussed in detail below. One of the unique features is the pressure-swing adsorption (PSA) subsystem performance check (maintenance BIT (M/BIT)). After verifying that the oxygen sensor accuracy is acceptable, a set of bleed valves (SV5 and SV6) are opened to load the concentrator beds BED1 and BED2 at a specific airflow rate. The C/M then checks the product oxygen concentration to determine whether the PSA subsystem is performing adequately (i.e. concentration above a predetermined limit (e.g. 50%)).

Turning now to FIG. 6, upon application of electrical power (+28 VDC for the C/M and 115 VAC for the aircraft), the C/M automatically executes a Power-Up Built-in-Test (PUB), which is an internal check of C/M integrity and includes a program checksum, a RAM check, and "reasonableness" checks of the oxygen sensor 02 and the cabin pressure transducer PT1. If PUB is successfully completed, the warning remains off and no indication is given via the "OXY LOW" lamp in the aircraft. If any failures are detected, the warning is activated. If PUB fails, momentarily depressing the BIT button on either the forward or aft pilot oxygen regulator front panel repeats PUB.

After PUB, the C/M enters a warmup state for approximately three minutes. The warning remains OFF during this time. This warmup is required for the oxygen sensor 02 to achieve specified accuracy.

If air is present, the C/M performs the sensor accuracy check during the warmup. If the C/M does not receive the air available signal from the aircraft avionics (i.e. "AIR AVAIL" in FIG. 6), it will wait indefinitely for the signal. When the signal is received, the C/M automatically performs the sensor accuracy check.

Once the C/M receives the air available signal from the aircraft, the C/M automatically performs the sensor accuracy test. During this test, concentrator inlet air is supplied to the sensor 02. At the end of 3 minutes, the sensor accuracy is checked by comparing the sensor output to the known value for air. If the accuracy check is successfully completed, the warning remains OFF and no indication is given. If a failure is detected, the warning is activated. If the accuracy test fails, momentarily depressing the BIT button on the regulator front panel repeats the accuracy test.

Upon successful completion of the sensor accuracy check, the C/M automatically enter the C-BIT mode of operation. This is the "normal" mode of operation and the C/M continuously compares the calculated oxygen partial pressure ($PPO_2$) of the concentrator product gas with a preset threshold of 182 mmHg $PPO_2$. During C-BIT, the C/M also performs an internal "periodic BIT" that will detect catastrophic failures of the input transducers. Any failures detected result in activation of the warning.

While in the C-BIT mode, the C/M is receptive to an I-BIT command. I-BIT is manually activated by momentarily depressing the BIT button on the regulator front panel. I-BIT verifies that the C/M is capable of activating the warning. When the BIT button is momentarily depressed, the C/M energizes solenoid valve SV3 to supply air to the sensor. When the air reaches the sensor and the $PPO_2$ level drops below the 182 mmHg threshold, the warning is activated. SV3 is then deenergized to switch back to concentrator product gas. When the $PPO_2$ level returns to above the 182 mmHg threshold, the warning is deactivated. If, within 2 minutes, the $PPO_2$ does not fall below 182 mmHg while exposed to air, or does not return to above 182 mmHg when again switched to concentrator product gas, the warning is activated. If the I-BIT fails, momentarily depressing the BIT button on the regulator front panel repeats the I-BIT test.

While in C-BIT, the C/M is receptive to an M-BIT command. The M-Bit is intended for use by maintenance personnel to perform an extended accuracy test of the C/M oxygen sensor and a performance test of the concentrator. This test requires electrical power and a minimum of 16 psig is applied to the concentrator. The M-Bit is activated by depressing and holding the BIT button on the regulator front panel for 20 seconds. At the end of 20 seconds, the warning is activated to indicate that the C/M is in the M-Bit mode of operation. The BIT button can then be released. M-BIT energizes solenoid valve SV3 to supply air to the sensor for a period of 3 minutes. At the end of 3 minutes, the sensor output is compared to a known value for air. If the accuracy test fails, the warning remains on.

If the sensor accuracy is within limits, the warning is deactivated and the C/M opens solenoid valves SV5 and SV6 for 2 minutes to establish a known flow from the concentrator. At the end of 2 minutes, the concentrator output is compared to a predetermined minimum limit (e.g. set at 45% oxygen). If the performance test is passed, the warning remains OFF. A failure results in the warning being activated. Alternatively, the C/M can open solenoid valves SV5 and SV6 at the start of the command. The point in time at which the warning is activated differentiates between C/M and concentrator failures. If the M-BIT fails, momentarily depressing the BIT button on the regulator front panel returns the C/M to C-BIT mode. M-Bit can be repeated as described above if desired.

A summary of the warning signal operation and applicable operator action is set forth in Table 1.

TABLE 1

Operational Modes "Warning Signal" Summary

| MODE | Warning Signal | Operator Actions (Comments) |
| --- | --- | --- |
| 1) Power-up-BIT (in Progress) | OFF | (1 to 2-second electronics test, automatic on application of power) |
| Power-Up BIT (Pass) | OFF | (Automatically proceed to warmup) |
| Power-Up BIT (Fail) | ON (latch) | Press BIT button to repeat PUB |
| 2) Warmup (In Progress)* | OFF | (3-minute sensor warm-up; continuously checks for inlet air signal; will bypass "wait" if air is available) |
| 3) Wait (Inlet Air Available)* | OFF | (Automatically proceed to sensor accuracy test) |
| Wait (Inlet Air Not Available)* | ON (activate) | None (ON after the 3-minute warmup; will wait indefinitely for inlet air signal; pressing the BIT button will have no effect) |
| 4) Sensor Accuracy Test (In Progress)* | OFF | (3-minute test from the time air is available, may be combined with warmup) |
| Sensor Accuracy Test (Pass) | OFF | (Automatically proceed to C-BIT) |
| Sensor Accuracy Test (Fail) | ON (latch) | Press BIT button to repeat sensor accuracy test |
| 5) Continuous BIT (In Progress) | OFF | May run I-BIT or M-BIT. (PP02 monitoring only) |
| Continuous BIT (Fail) | ON (active) | None (Continuous monitoring; warning will go OFF if PP02 goes above threshold; pressing the BIT button will run I-BIT) |
| 6) I-BIT (In Progress/Pass) | OFF/ON/OFF | (May take up to 2 minutes) |
| I-BIT (In Progress/Fail) | OFF/ON latch | Press BIT button to repeat I-BIT (ON after 2-minute timeout) |
| 7) M-BIT (In Progress/Pass) | ON/OFF | (Automatically returns to C-BIT) |
| M-BIT (In Progress/Fail; Accuracy test) | ON (latch) | Press BIT Button to return to C-BIT |
| M-BIT (In Progress/Fail; Concentrator test) | ON/OFF/ON (latch) | Press BIT Button to return to C-BIT |

*Can be done simultaneously if inlet air is available during warmup.

Alternative embodiments are possible without departing from the sphere and scope of the invention as defined by the claims appended hereto.

We claim:

1. A method of controlling performance of an oxygen concentrator having a first molecular sieve bed which is operated over successive control periods according to a duty cycle, said duty cycle including time periods for alternately pressurizing and flushing said first molecular sieve bed, and a second molecular sieve bed which is operated over the successive control periods, said duty cycle including time periods having a length which is a reciprocal of said time periods of the first molecular sieve bed during a particular control period for alternately flushing and pressuring said second molecular sieve bed, the method comprising the steps of:

a) adjusting said time periods during successive duty cycles and successive time periods during the reciprocal duty cycle during every second one of said successive control periods to change the time period for pressurizing relative to the time period for flushing of said first molecular sieve bed and to change the time period for the flushing relative to the time period for the pressurizing of the second molecular sieve bed, thereby degrading performance of the oxygen concentrator for reducing concentration of oxygen produced by the oxygen concentrator; and b) adjusting the time period during the duty cycle and the time period during the reciprocal duty cycle during remaining control periods to change the time period for the flushing relative to the time period for the pressurizing of the first molecular sieve bed and to change the time period for the pressurizing relative to the flushing of the second molecular sieve bed, such that water vapor is purged from the first and the second molecular sieve beds after pressurizing thereof.

2. The method of claim 1, wherein the duty cycle pressurizing and flushing is adjusted within a range of from 50—50% for highest performance to 80%-20% for lowest performance.

3. The method of claim 1, wherein step a) comprises prolonging the time period.

4. The method of claim 3, wherein each of the time periods of a duty cycle during a control period is the same.

5. The method of claim 1, wherein step a) comprises shortening the time period.

6. The method of claim 5, wherein each of the time periods of a duty cycle during a control period is the same.

7. The method of claim 1, wherein the time period is shortened when the oxygen concentration reaches a predetermined minimum level.

8. The method of claim 1, wherein the time period is lengthened when the oxygen concentration reaches a predetermined maximum level.

9. An aircraft oxygen system for providing a controlled concentration of oxygen to the cabin of said aircraft, comprising:

a) an air inlet;

b) an exhaust port;

c) a slide valve connected to said air inlet and said exhaust port;

d) first and second molecular sieve beds each having an inlet connected to said slide valve and an outlet to said cabin; and e) a controller for operating said slide valve over successive control periods at high altitudes according to a duty cycle for alternately pressurizing and flushing said first molecular sieve bed and a reciprocal of said duty cycle for alternately flushing and pressurizing said second molecular sieve bed to generate oxygen enriched product gas, said duty cycle including time periods having a length for said first molecular sieve bed and a time period for the second molecular sieve bed which is a reciprocal of the length of the time period for said first molecular sieve bed, said controller controlling said slide valve by adjusting said duty cycle and said reciprocal duty cycle during every second one of said successive control periods to change the time period of the first molecular sieve bed for pressurizing relative to said flushing of said first molecular sieve bed and to change the time period of the second molecular sieve bed flushing relative to said pressurizing of said second molecular sieve bed, thereby changing the concentration of oxygen in said product gas, such that water vapor is purged from said first and second molecular sieve beds after pressurizing thereof.

10. The aircraft oxygen system of claim 9, further comprising an oxygen sensor for measuring oxygen concentration of said product gas produced by said first and second molecular sieve beds and communicating said oxygen concentration to said controller for controlling said duty cycle and said reciprocal duty cycle.

11. The aircraft oxygen system of claim 10, further comprising a built-in-test system for applying ambient air to said oxygen sensor for a first predetermined time period, comparing the oxygen concentration in the ambient air detected by said sensor to a predetermined threshold value and in the event said oxygen concentration is not below said predetermined threshold value then activating an alarm to indicate malfunction of said sensor.

12. The aircraft oxygen system of claim 11, further comprising an oxygen concentrator performance check system for applying a predetermined flow of said product gas from said first and second molecular sieve beds for a further predetermined time period, comparing the oxygen concentration of said product gas at said outlet detected by said sensor to a further predetermined threshold value and in the event said oxygen concentration is not above said further predetermined threshold value then activating an alarm to indicate malfunction of said molecular sieve beds.

13. The aircraft oxygen system of claim 9, wherein said slide valve is connected to a pair of opposing air cylinders which are alternately pressurized and vented by a pair of pilot operated solenoid valves connected to said controller, such that when a first one of said cylinders is pressurized the other one of said cylinders is vented and said slide valve is pushed in a first direction for pressurizing said first molecular sieve bed and flushing said second molecular sieve bed and when the other one of said cylinders is pressurized the first one of said cylinders is vented and said slide valve is pushed in an opposite direction for pressurizing said second molecular sieve bed and flushing said first molecular sieve bed.

14. The system of claim 9, wherein the time period for pressurizing of the first molecular sieve bed is changed to a longer time period.

15. The system of claim 9, wherein the time period for pressurizing of the first molecular sieve bed is changed to a shorter time period.

16. The system of claim 9, wherein the time period for pressurizing is shortened when the oxygen concentration of the product gas reaches a predetermined minimum level.

17. The system of claim 9, wherein the time period for flushing the first molecular sieve bed is lengthened when the oxygen concentration of the product gas reaches a predetermined maximum level.

* * * * *